United States Patent

Rogers et al.

[15] 3,650,607
[45] Mar. 21, 1972

[54] REAR VIEWING DEVICE

[72] Inventors: Albert B. Rogers, 1417 Shannonhouse Drive, Charlotte, N.C. 28205; Arthur N. Rogers, P.O. Box 168, Camilla, Ga. 31730

[22] Filed: Aug. 6, 1970

[21] Appl. No.: 61,641

[52] U.S. Cl. ................................................. 350/289, 91/52
[51] Int. Cl. ........................................................ G02b 5/08
[58] Field of Search ............... 350/289, 303, 304, 307; 91/52

[56] References Cited

UNITED STATES PATENTS

| | | | |
|---|---|---|---|
| 3,480,355 | 11/1969 | Smith | 350/289 |
| 3,411,412 | 11/1968 | Phipps | 91/52 |
| 3,492,065 | 1/1970 | Kurz, Jr. | 350/289 |

*Primary Examiner*—David Schonberg
*Assistant Examiner*—John W. Leonard
*Attorney*—Parrott, Bell, Seltzer, Park and Gibson

[57] ABSTRACT

A rear viewing device which is remotely adjustable to permit viewing of a wide area by the operator of a vehicle, and which has provision for automatically returning to its normal viewing position. The device includes a mirror which is mounted for rotation about a vertical axis, and an air control system for rotating the mirror away from its normal position. The control system includes an air cylinder, an adjustable inlet valve for admitting air to the cylinder at a controlled rate, and an air relief passage in the cylinder for exhausting the air therefrom at a controlled rate. A biasing spring is provided to return the mirror to its normal position when the inlet valve is closed and the air has exhausted from the cylinder.

7 Claims, 5 Drawing Figures

Patented March 21, 1972
3,650,607
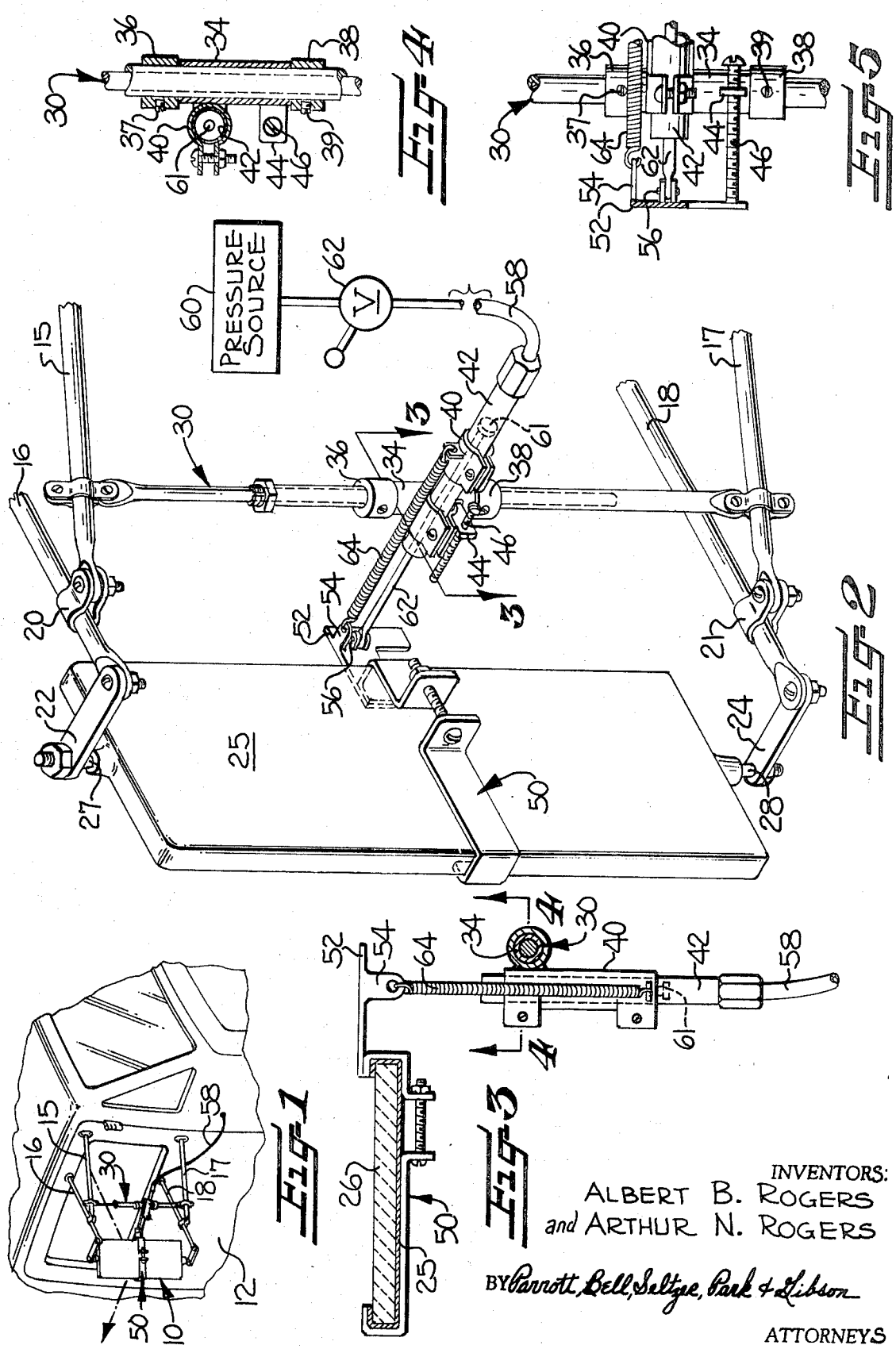
INVENTORS:
ALBERT B. ROGERS
and ARTHUR N. ROGERS
BY Parrott, Bell, Seltzer, Park & Gibson
ATTORNEYS

REAR VIEWING DEVICE

The present invention relates to a rear viewing device of the type commonly attached to a vehicle such as an automobile, truck or the like.

More particularly, the invention relates to a rear viewing device which is remotely adjustable to permit selective viewing of a wide area by the operator of the vehicle, and which is automatically returnable to its original predetermined normal viewing position.

Generally, rear viewing devices for vehicles pulling a trailer are mounted on the outside of the vehicle such that the operator is provided with a line of vision rearwardly along the side of trailer. Such mirrors are manually rotatable about a vertical axis to establish a normal rear viewing position, but since the operator cannot readily reach the mirror from his seat, the line of vision cannot effectively be changed without the aid of a second person. Thus the operator has a very limited field of view in the rearward direction, and this is particularly disadvantageous where a turn must be made at a sharp intersection or where the driver must back into a narrow alleyway or loading dock.

It has been proposed to provide a pneumatically adjustable rear viewing device wherein the line of vision may be periodically changed by the operator from his seat. However, known devices of this type are difficult and cumbersome to operate, and they require a critical adjustment of a control valve by the operator in order to rotate the mirror to a particular desired angle of viewing. Also, a separate manipulative operation is required to return the mirror to its normal viewing position.

It is accordingly an object of the present invention to provide a remotely controlled rear viewing device having a simplified control system for rotating the mirror to a selected viewing angle and for automatically returning the mirror to its normal viewing position upon deactuation of the control system.

It is a further object of the present invention to provide a pneumatically actuated rear viewing device wherein the angle of rotation of the mirror is determined by the degree to which a control valve is opened, and wherein the mirror is automatically returned to its normal viewing position upon closure of the valve.

It is another object of the present invention to provide a rear viewing device which may be easily and quickly adjusted to a selected viewing angle and returned to its normal viewing angle without unduly distracting the operator of the vehicle. It is a further object to provide a remotely adjustable rear viewing device of the above type which is simple in design and which may be easily associated with mirrors of conventional design.

These and other objects and advantages of the present invention are achieved in the embodiment illustrated herein by the provision of a mirror which is adapted to be attached to the side of a vehicle and supported for rotation about a substantially vertical axis. The mirror is retained in its normal rear viewing position by a resilient biasing member, and a force applying means is provided to rotate the mirror about its axis against the action of the biasing member to one of a plurality of other viewing positions. A force relieving means is provided for automatically relieving the force on the mirror upon deactuation of the force applying means to permit the biasing member to return the mirror to its normal viewing position.

Some of the objects and advantages of the invention having been stated, others will appear as the description proceeds, when taken in connection with the accompanying drawings, in which—

FIG. 1 is a fragmentary perspective view of the rear viewing device of the present invention attached to a truck cab;

FIG. 2 is an enlarged perspective view of the rear viewing device of the present invention;

FIG. 3 is an overhead sectional view of the rear viewing device taken substantially along the line 3—3 of FIG. 2;

FIG. 4 is a sectional view of the air cylinder and its mounting structure taken substantially along the line 4—4 of FIG. 3;

FIG. 5 is a side elevational view, partly sectioned, of the air cylinder and its mounting structure and illustrating the screw for adjusting the normal viewing position of the mirror.

Referring to the drawings, the rear viewing device of the present invention is illustrated generally at 10 in FIGS. 1 and 2. In FIG. 1, the device is shown attached to a truck cab 12 by means of a pair of outwardly extending upper support arms 15 and 16, and a pair of outwardly extending lower support arms 17 and 18. The outer extremities of each pair of support arms are joined by a suitable clamp 20 and 21, and the arms 16 and 18 fixedly mount a pair of horizontally extending brackets 22 and 24, respectively. A supporting frame 25 for the mirror 26 is carried between the horizontally extending brackets 22 and 24, and is mounted for rotation about a substantially vertical axis defined by the coaxial shafts 27 and 28.

A vertical arm 30 is mounted between the support arms 15 and 17 and immediately behind the mirror frame 25. The arm 30 carries a tubular member 34 which is rotatable about the arm 30, and upper and lower collars 36 and 38, respectively, which are fixedly connected to the arm by suitable set screws 37 and 39. Thus the collars serve to maintain the vertical positioning of the member 34 without precluding its free rotation about the axis of the vertical arm 30. The member 34 in turn carries a bracket 40 for horizontally mounting air cylinder 42, and a threaded nut 44 for the adjustment screw 46. The bracket 40 and nut 44 may be attached to the member 34 by any conventional means, such as welding.

The mirror frame 25 includes a mirror clamp 50 which is mounted along the rear side of the frame. The clamp 50 is preferably constructed from two interconnected parts as shown in the drawings so as to be easily attached to or removed from the frame. The clamp includes an extremity 52 which extends radially beyond the periphery of the mirror and which carries a horizontal tab 54 and a hinge 56 for the purposes hereinafter set forth.

The air cylinder 42 is of conventional design, such as Starz Model No. 7–S–2. Its air inlet is connected through a suitable conduit 58 to a pressure source 60 such as for example the air source in a truck air brake system. A valve 62 capable of admitting air at a variable controlled rate is positioned in the conduit 58 and is preferably positioned adjacent the driver in the cab of the vehicle. A piston 61 is mounted for translation within the air cylinder 42 and is operatively connected to the mirror by means of a horizontal rod 62 which in turn is pivotally connected at its outer end to the extremity 52 via the hinge 56. A spring 64 is mounted between the tab 54 of the extremity 52 and the mounting bracket 40 for resiliently biasing the mirror against outward movement of the piston 61.

The normal viewing position for the mirror is determined by the adjustment screw 46. As best seen in FIG. 5, the mirror will normally be biased toward the air cylinder and the extremity 52 will abut the end of the screw 46. Thus rotation of the screw 46 permits the mirror to be adjustably positioned at a desired normal viewing angle.

Whenever it is desired to rotate the mirror from its normal viewing position, the operator merely opens the valve 62. The air passing through the valve enters the air cylinder 42 and translates the piston 61 and rod 62 to the left as seen in FIG. 2. The mirror is thereby rotated in a counter clockwise direction. Since the relative positioning of the air cylinder and mirror frame will be changed during this process, it is important to note that the mounting bracket 40 will rotate somewhat about the arm 30, and the rod 62 will pivot somewhat in relation to the extremity 52.

By design, the clearance between the external diameter of the piston 61 and the internal bore of the air cylinder is sufficient to provide an exhaust passage in the cylinder. As a result, the air entering the cylinder will slowly bleed past the piston and exhaust from the cylinder. This fact permits the rate of air passing through the valve 62 to determine the angle of rotation of the mirror. More particularly, as the rate of flow is increased through the valve 62, the piston will be moved to the left until the force of the spring 64 is sufficient to balance the force being exerted on the piston. An increase in the rate of flow through the valve will increase the force on the piston and thereby move it further to the left until balance is again obtained. When the valve 62 is closed, the air will continue to bleed past the piston, reducing the force acting on the piston, and the spring will slowly return the mirror to its normal viewing position.

From the above description, it will be apparent that the mirror may be easily rotated to any desired position, and held there for an extended period of time. To provide a sweep by the mirror over a large viewing area, it is merely necessary to open the valve 62, and then close it when the mirror reaches its point of maximum rotation. Upon closing of the valve 62, the mirror is automatically returned to its normal viewing position.

In the drawings and specification, there has been set forth a preferred embodiment of the invention, and although specific terms are employed, they are used in a generic sense only and not for purposes of limitation.

We claim:

1. A rear viewing device adapted to be attached to a vehicle such as an automobile, truck or the like, and which is remotely adjustable to permit selective viewing of a wide area by the operator of the vehicle and which is automatically returnable to its original predetermined normal viewing position, said device comprising, a mirror, support means adapted to be attached to said vehicle for mounting said mirror for rotation about a substantially vertical axis, means carried by said support means and connected to said mirror for resiliently biasing said mirror to a predetermined normal viewing position, an air cylinder carried by said support means, a piston mounted for translation within said air cylinder and operatively connected to said mirror, the external surface of said piston and the internal bore of said cylinder defining therebetween a clearance, an air pressure source operatively communicating with said air cylinder, valve means for permitting the passage of air at an adjustable and controlled rate from said air pressure source into said air cylinder to thereby translate said piston along said cylinder and rotate said mirror, said air cylinder, said piston, said clearance and said valve means cooperating for applying a force in a direction and of sufficient magnitude to rotate said mirror about said axis against the action of said biasing means from said predetermined normal viewing position to one of a plurality of other viewing positions and for automatically relieving the force on said mirror by exhausting air from said cylinder at a controlled rate whereby the rate of air passage through said cylinder determines the angle of rotation of the mirror and the mirror will be returned by said biasing means to its normal viewing position when the rate of air passage through said cylinder and said clearance is reduced to zero.

2. The rear viewing device as defined in claim 1 wherein said support means comprises an upper support arm, a lower support arm, and a mirror frame extending between said upper and lower support arms.

3. The rear viewing device as defined in claim 2 wherein said support means further comprises a vertical arm extending between said upper and lower support arms and in spaced relation to said mirror frame, and said air cylinder extends in a horizontal direction and is carried by said vertical arm.

4. The rear viewing device as defined in claim 3 wherein said resilient biasing means comprises a spring extending between said mirror frame and said vertical arm.

5. The rear viewing device as defined in claim 4 further comprising means for adjusting the predetermined normal viewing position of the mirror and including a threaded member carried by said vertical arm and positioned to engage said mirror frame.

6. The rear viewing device as defined in claim 3 wherein said air cylinder is rotatable about the axis of said vertical arm, and a horizontal rod extends between said piston and said mirror frame to operatively connect the piston and mirror.

7. The rear viewing device as defined in claim 6 wherein said rod is pivotally connected to said mirror frame.

* * * * *